358-69. OR 2,896,016 SR

SEARCH ROOM

T 6532

INVENTOR.
ROGER D. THOMPSON
BY
ATTORNEY

July 21, 1959 R. D. THOMPSON 2,896,016

COLOR IMAGE REPRODUCING APPARATUS

Filed March 27, 1956 6 Sheets-Sheet 2

INVENTOR.
ROGER D. THOMPSON
BY
[signature]
ATTORNEY

INVENTOR.
ROGER D. THOMPSON
BY
[signature]
ATTORNEY

INVENTOR.
ROGER D. THOMPSON
BY
[signature]
ATTORNEY

COLOR IMAGE REPRODUCING APPARATUS

Filed March 27, 1956 6 Sheets-Sheet 5

INVENTOR.
ROGER D. THOMPSON
BY
[signature]
ATTORNEY

INVENTOR.
ROGER D. THOMPSON
BY [signature]
ATTORNEY

United States Patent Office 2,896,016

Patented July 21, 1959

2,896,016

COLOR IMAGE REPRODUCING APPARATUS

Roger D. Thompson, Princeton, N.J., assignor to Radio Corporation of America, a corporation of Delaware Application March 27, 1956, Serial No. 574,115

20 Claims. (Cl. 178—5.4)

The present invention relates to new and improved television image reproducing apparatus and, particularly, to apparatus of the type employing a cathode ray tube of the so-called "line screen" variety.

Among the forms of color television reproducing apparatus proposed thus far in one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically. Means are provided additionally to insure that the video signals representative of the respectively different component colors of the image being televised are employed in controlling the intensity of the beam component intended to illuminate a given color producing element. Such means may employ, for example, special elements (e.g., strips of ultra-violet light-emitting material) associated with the target screen for sensing the position of the beam components and for providing an indication thereof in the form of index signals, so that the operation of the image reproducing apparatus may be controlled through the agency of means responsive to the index signals.

In the case of a color kinescope of the above type wherein the color light-producing elements or strips are vertically oriented, so that the lines of the scanning raster are generally perpendicular thereto, the scanning electron beam is sequentially modulated in intensity with video signals respectively representative of the different colors to be reproduced as the beam is deflected across the strip-like elements. Thus, the intervals of beam modulation with a particular color-representative signal must correspond to intervals during which the beam impinges upon a particular color light-producing element. Thus it has been proposed that the screen of such a tube include index signal producing elements positioned to generate index signals indicative of the position of the electron beam with respect to the light-producing elements.

It has been found that, in line screen tubes including index signal generating elements for control purposes, the index signals derived from a given line scan are quite similar to the corresponding signals produced during another line scan.

It is, therefore, an object of the present invention to provide new and improved color image reproducing apparatus.

Another object of the invention is that of providing, in a color television arrangement involving an electron beam adapted to impinge sequentially upon respectively different areas of a target screen, an improved arrangement for insuring that the beam is properly modulated in intensity by color representative video signals as it impinges upon the different areas of the screen.

In an arrangement disclosed in the copending U.S.

patent application of R. D. Kell, Serial No. 519,156, filed June 30, 1955, a color television image reproducing tube of the type in question is operated in such manner that certain lines of a raster are employed as screen "search" lines, while the remaining lines in the raster are active in producing video images, so that the latter may be termed "display" lines. That is to say, during the search lines, index signals are derived from the scanning of the index signal strips of the screen by the electron beam. These index signals, which are indicative of successive beam positions on the screen, are delayed by approximately a television line scanning interval and are employed in controlling modulation of the beam with color-representative video signals during the search lines of the field. In this fashion, the undesirable effects of "cross talk" or "video pulling" of video modulation of the beam with the index signals which may result when both index signals and images are produced during the same line intervals are substantially eliminated. It has, however, been found that a noticeable "crawl" or vertical movement of the scanning lines results unless special steps are taken with respect to the scanning deflection sequence. It will be recognized, therefore, that the present invention is in the nature of an improvement over the cited Kell arrangement.

In general, the present invention comprises a color image reproducing arrangement employing an image display screen such as the vertical line screen of a color kinescope, which screen includes spaced index signal generating strip-like elements associated with the groups of color phosphors of the screen. Means are provided for deriving index signals from the image display screen as the scanning progresses from one to another of the index elements. Gating means so control the intensity of energization of the elemental areas of the screen that certain of the lines (i.e., "search" lines) of each scanning field are devoted, at least in part, solely to the production of index signals, while the remaining lines are employed as "display" lines in producing color television image light. Also, in accordance with the invention, means are provided in association with the scanning deflection generator for so controlling vertical scanning that the display lines of successive fields form an interlaced pattern which is not subject to such undesirable effects as line crawl. By virtue of the apparatus of the present invention, novel scanning patterns may be produced, which patterns improve the subjective viewing quality of the reproduced images.

Additional objects and advantages of the present invention will become apparent to those skilled in the art from a study of the following detailed description of the accompanying drawing, in which.

Figures 1, 2, 3:
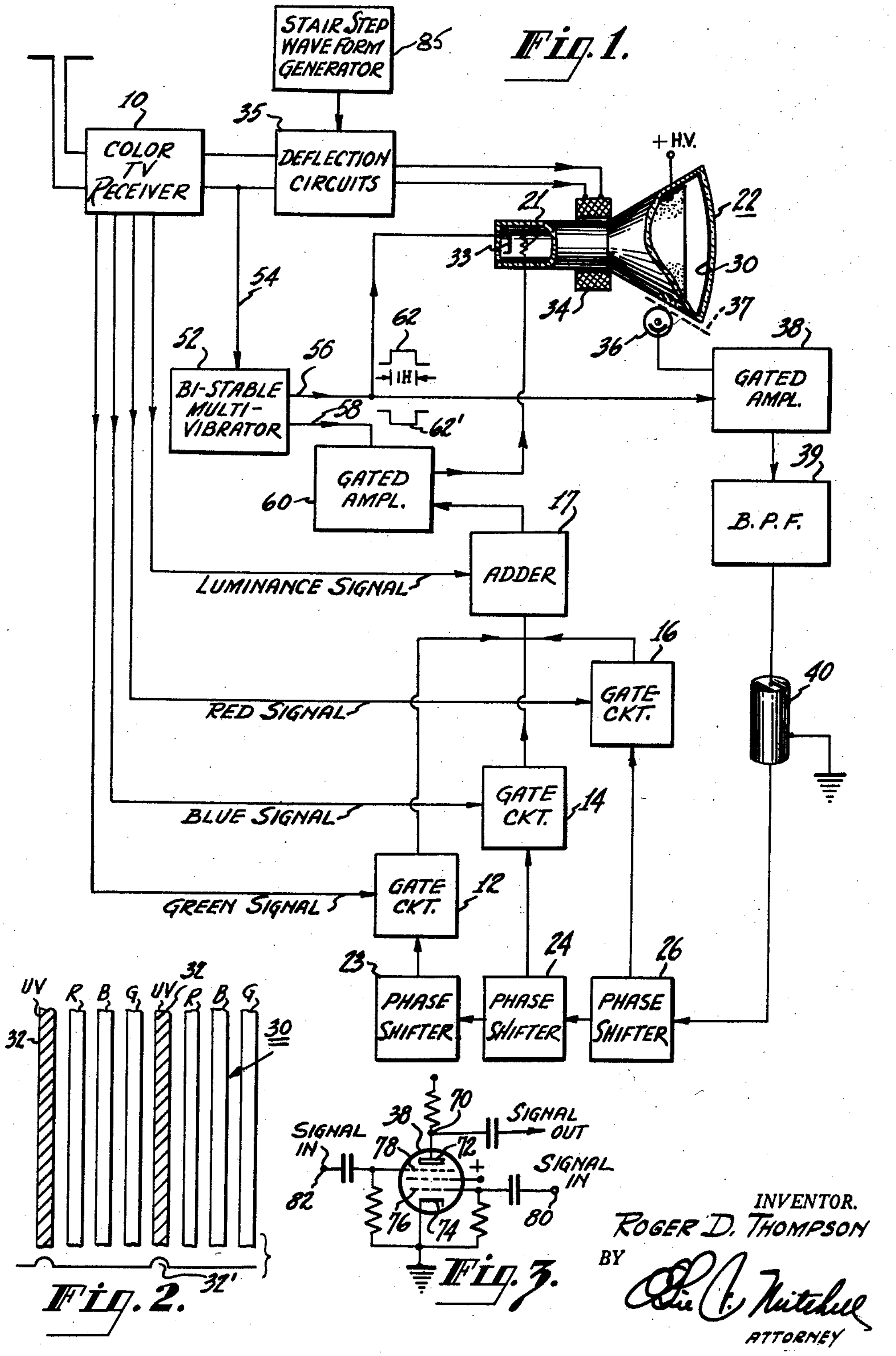
Figure 1 is a block diagram illustrative of a specific form of the present invention.
Figure 2 is a fragmentary view, greatly enlarged, of a portion of the cathode ray tube screen of Figure 1.
Figure 3 illustrates schematically a circuit which may be employed in the arrangement of Figure 1.
Figure 14:
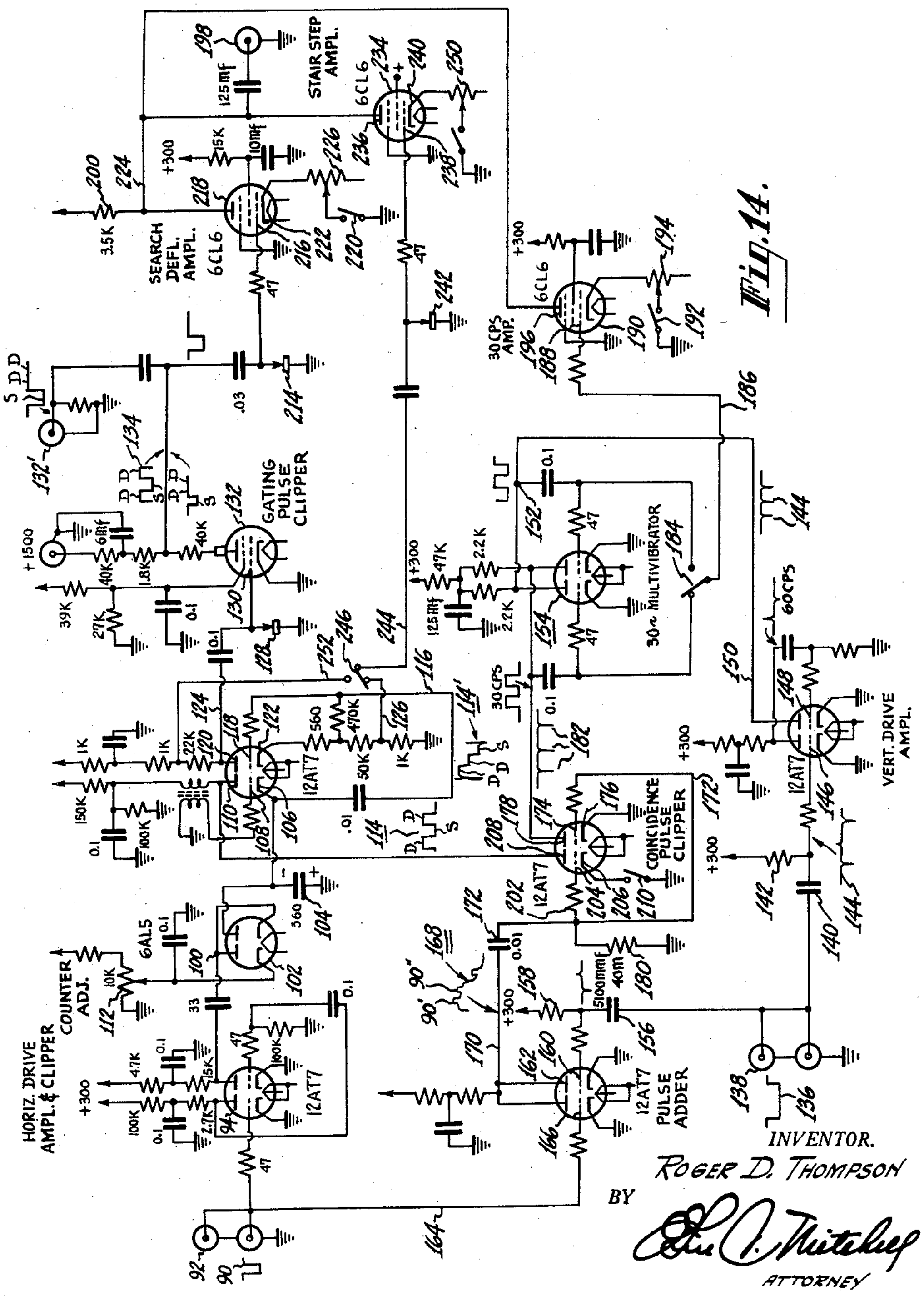
Figure 15:
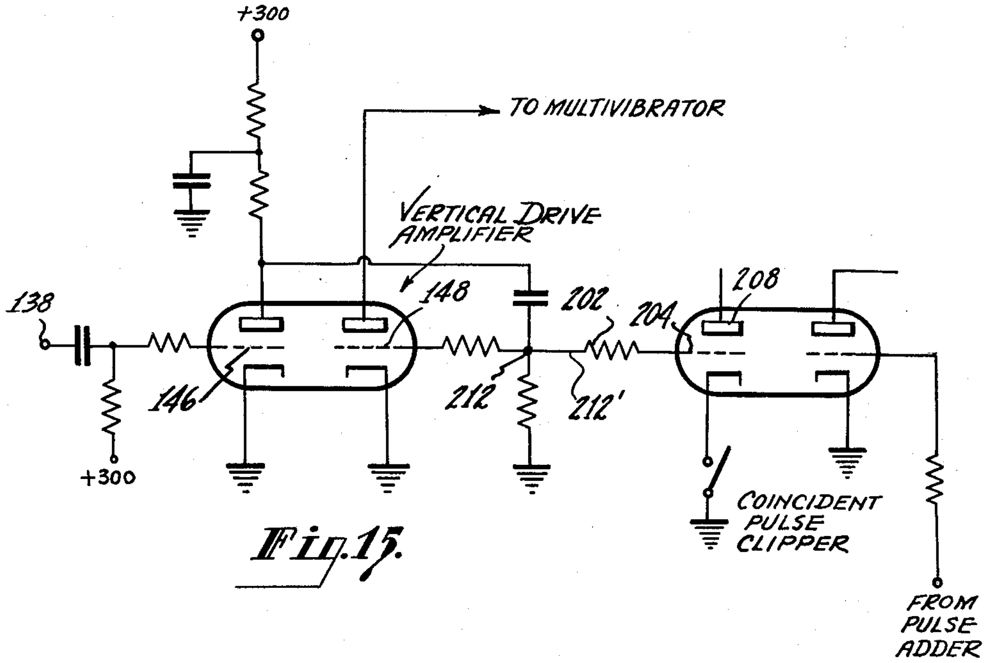
Figure 16:
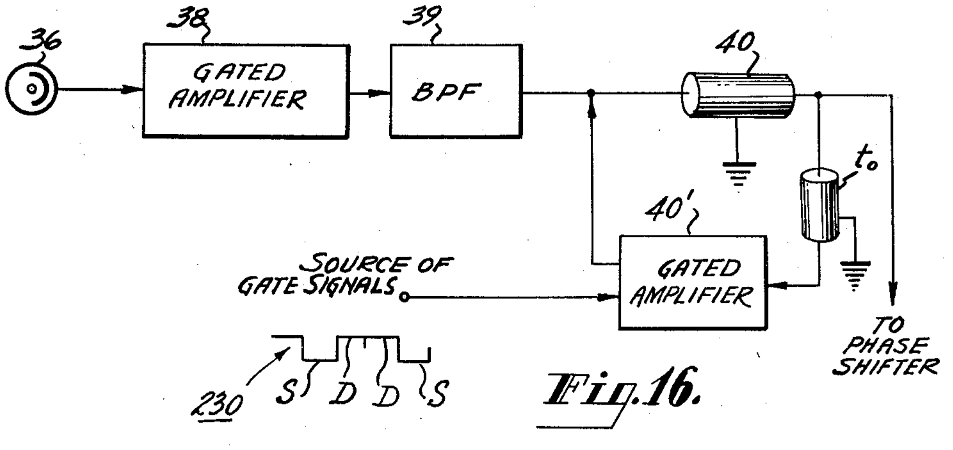

Figures 4–13, inclusive, illustrate diagrammatically certain scanning raster patterns to be described;

Figure 14 is a schematic diagram of a stairstep waveform generator which may be employed in the arrangement of Figure 1; and Figures 15 and 16 illustrate modified forms of the apparatus of Figure 1.

Referring to Figure 1, there is shown a color television receiver 10 which is utilized for receiving a composite television signal including luminance and chrominance signal components and forming from the latter respectively different component color-representative video signals such, for example, as a green color-difference signal, a blue color-difference signal, and a red color-difference signal. A television receiver for deriving such color signals from a received color television signal is shown and described in "Practical Color Television for the Service Industry," second edition, revised edition, April 1954, published by the RCA Service Co. Inc., a Radio Corporation of America subsidiary. The color-difference signals G–Y, B–Y and R–Y are applied respectively to gate circuits 12, 14 and 16. The control or gating of the gate circuits 12, 14 and 16 is effected by gating signals derived in phase shifting circuits 23, 24 and 26 in a manner to be described. The television luminance signal (Y) detected in the receiver is applied to an adder circuit 17 for combination with the color difference signals to form color video signals.

The gated color signals from the gate circuits 12, 14 and 16 are combined with the Y signal in the adder 17 and applied to the beam intensity control electrode 21 of an image reproducing kinescope 22. The image reproducing kinescope 22 includes a target screen 30 shown more fully in the enlarged, fragmentary view of Figure 2. The target screen 30 comprises a transparent foundation plate (e.g., the glass face plate of a kinescope) having strip-like color light-producing elements R, B, and G positioned thereon and oriented vertically. As described in the U.S. Patent No. 2,310,863 granted to Leverenz, the color light producing phosphor elements of the screen may comprise the following materials: chromium-activated aluminum berylliate or zinc cadmium sulfide activated by silver for the red elements R, silver-activated zinc sulfide and zirconium silicate for the blue elements B and alphawillemite activated with manganese or zinc cadmium sulfide activated with silver for the green elements G. The color light-producing strip-like elements may be positioned in the order shown in Figure 2. Associated with the color producing elements are index signal generating elements in the form of ultra-violet light-emitting phosphor strips 32. For example, an electron-transparent light-reflecting layer (not shown) of aluminum may be positioned behind the color light-producing elements R, B and G and the ultra-violet light-emitting phosphor strips 32 may be positioned behind the aluminum coating between the groups of phosphors R, B and G. Guard spaces are provided between the elements R, B and G and the ultra-violet strips are located in appropriate ones of the guard spaces.

An electron gun in the kinescope including the control electrode 21 and cathode 33 produces and directs an electron beam (not shown) toward the screen 30. The beam is caused to scan a raster pattern on the screen under the control of an electromagnetic deflection yoke 34 which is energized by suitable line and field frequency deflection currents from circuits 35 which are operated in synchronism with the transmitter by means of synchronizing signals contained in the received composite television signal.

It will thus be understood that, as the electron beam in the kinescope 22 scans horizontally across the target screen 30, the beam will sequentially impinge upon red, blue, green and ultra-violet light-emitting strip-like elements. It will further be understood that it is desired to control the gate circuits 12, 14 and 16 through the application of gating signals in such manner that the electron beam in the kinescope is sequentially modulated with red-, blue-, and green-representative video signals. The intervals during which the electron beam is modulated with these different signals must coincide with the intervals during which the electron beam impinges upon the different strip-like color light-producing elements on the image screen within the reproducing tube 22. During the time when the electron beam impinges upon one of the index signal-generating elements 32, an ultra-violet light index signal will be emitted. The ultra-violet light index signals are sensed by a light-responsive photoelectric cell 36 through an ultra-violet light passing filter 37 positioned in a window of the tube 22.

The index signals sensed by the photoelectric cell 36 are amplified by a gated amplifier stage 38 and are filtered by a bandpass filter 39 to provide a sinusoidal gating wave for application to the phase shifting circuits 26, 24 and 23. The center frequency of the filter 39 is chosen to match the frequency of the ultra-violet light pulses produced by traversal of the index elements by the beam, which frequency is, in turn, a function of the number of index elements and their spacing and the speed of beam travel. The pulses 32′ in Figure 2 illustrate the fact that, each time the electron beam in the kinescope scans across an ultra-violet light-emitting strip 32, an index signal pulse 32′ is produced. Thus, the control signal derived from the bandpass filter 39 will be understood as being a signal whose frequency is indicative of the number of signal generating elements 32 scanned by the electron beam during a particular period. A similar switching arrangement is shown and described in U.S. Patent No. 2,545,325, issued to P. K. Weimer, March 13, 1951.

The wave from the output of the filter 39 is applied via delay apparatus 40 (to be described more fully hereinafter) to the input of the first phase shifting circuit 26. Each of the phase shifting circuits 26, 24 and 23 introduces a fixed phase shift (e.g., 120°) into the wave from the filter 39. The phase-shifted waves, when applied to the gate circuits 16, 14 and 12 will, therefore, cause the gate circuits to sequentially pass the red, blue and green color-difference signals to the control electrode 21 of the kinescope. As these video signals are sequentially applied to the electrode 21, the electron beam in the kinescope is intensity modulated according to the intensity of the gated video signals. Circuits suitable for performing the gating functions and phase-shifting functions are shown and described in the above-cited Weimer patent.

As stated in the cited Kell application, the various elements in the feedback path which may be traced from the kinescope screen, through the amplifying, filtering, gating circuits and back to the kinescope screen include inherent delay. In fact, such delay may cause the utilization of information from the photocell to be late by two or three groups of color light-emitting phosphor elements. Where, moreover, the scanning velocity is not uniform, the time delay in the use of the sampling information or gating signal results in the production of incorrect color on the screen of the kinescope. To overcome the foregoing-described difficulty, there is provided the delay apparatus indicated by the section of delay line 40, which apparatus introduces a time delay in the index signal between the phototube and the utilization circuits which is equal to the period of one scanning line interval minus the other time delays in the feedback path. The inherent delays in the circuit may be lumped together and designated as $t_0$. The delay in the kinescope itself may be designated as $t_1$, while the delay preceding the delay line 40 is designated $t_2$ and the delay in the circuits following the delay line is designated as $t_3$. Thus, the delay line 40 is actually equal to 1H (i.e., the period of a single scanning line interval) minus $t_0$, where $t_0$ is the sum of $t_1$, $t_2$ and $t_3$.

It will be recognized from the foregoing that the total delay through the feedback loop is, by virtue of the inclusion of the delay apparatus 40 having a time delay of $1H-t_0$, equal to exactly one horizontal scanning line interval. Thus, the timing of the gating of the video signals onto the control electrode of the kinescope during any given line interval is based upon information derived from the index signals produced during the preceding line interval. Stated otherwise, the color information as reproduced on the screen 30 of the kinescope is displaced vertically by one scanning line. Assuming the sides of the scanning raster to be substantially vertical, the position in time of an ultra-violet light-generated index signal 32′ is after the signal has passed through the delay line 40, coincident with the beam traversal of the same index strip 32 during the succeeding line scan. By reason of the foregoing, the accuracy of the video signal application to the electron beam intensity control electrode in the kinescope is rendered independent of scanning velocity irregularities over a practical range of such irregularity.

While any suitable apparatus of known variety may be employed for producing the $1H-t_0$ delay of the apparatus 40, one suitable form is a quartz rod of proper dimensions having a quartz crystal transducer on each end to form an ultrasonic delay line. If desired, the delay line may be built into the filter 39 which may have a passband centered about the sampling frequency. Other forms of delay apparatus, such as a mercury delay line, for example, may be employed alternatively.

The apparatus of Figure 1 also includes certain additional components disclosed in the cited Kell application for producing only index signals during alternate lines of the raster (i.e., the search lines) and for producing color image information on the screen of the kinescope during the intervening display lines under the control of the index signals derived during the preceding search lines. Specifically, a bistable multivibrator 52 receives via a lead 54 the horizontal synchronizing pulses derived in the receiver 10 from the composite received television signal. The multivibrator 52 provides at its output leads 56 and 58 opposite polarities of a rectangular wave which is of half the line frequency. That is to say, each positive-going cycle of the rectangular wave has a period equal to one horizontal scanning line period and each negative-going half cycle of the wave has the same duration. Signals from the lead 56 are applied to the cathode 33 of the kinescope, while signals from the lead 58 are applied to the gated amplifier 60 which serves as a signal coupling circuit between the adder 17 and the kinescope control electrode.

When the positive-going half cycle of the controlling wave 62 from the multivibrator 52 is applied to the kinescope cathode and the negative-going half cycle of the controlling wave is applied to the gated amplifier 60, the following actions take place: the gated amplifier 60 is prevented from conducting during the period of the negative half cycle of the wave 62 and the beam current in the kinescope 22 is reduced to a level sufficient to produce ultra-violet light control signals but insufficient to produce appreciable visible light from the screen of the kinescope. During this interval, no video signal modulation of the electron beam in the kinescope occurs. Also during this interval, however, the positive-going half cycle 62 of the wave from the multivibrator 52 is applied to the gated amplifier 38 to cause that amplifier to pass index signals from the photocell 36 through the feedback path. Thus, the index signals produced during the first line interval of a given television field, which line includes no video modulation of the beam, are passed through the delay apparatus 40 and applied to the phase shifter circuits 26, 24 and 23. During the second line interval of that field, the reverse polarities of the waves 62 and 62' are applied to the respective receiving points, so that the gated amplifier 38 is prevented from passing index signals during that line interval, but video signals are passed by the gated amplifier 60 to the control electrode of the kinescope 22 for the sequential modulation of the electron beam intensity with color-representative video signals. Thus, line No. 2 of the scanning field in question is productive of color image light. Assuming the sequence of alternate search and display lines as just described, it will be understood that the third, fifth, seventh, etc. lines will be search lines and that the fourth, sixth, eighth, etc. lines will be display lines.

Before describing in greater particularity the apparatus of the present invention, it may be noted that Figure 3 illustrates circuitry suitable for performing the functions of the gated amplifiers 38 and 50 of Figure 1. By way of example, the gated amplifier 38 may comprise a multi-electrode electron tube having an anode load terminal 70 connected to its anode 72, a cathode 74 and conduction controlling electrodes 76 and 78. The index signal to be passed by the amplifier 38 during alternate line intervals is applied to the terminal 80 for application to the first control grid electrode and the gating pulse from the multivibrator 52 is applied to a terminal 82 for application to the third control grid electrode. When the wave applied to the electrode 78 is positive-going, the tube 38 is conductive to pass the signal applied at the terminal 80 to its output terminal 70. Conversely, when the wave applied to the terminal 82 is a negative wave, the amplifier 38 is prevented from conducting.

Figures 4, 5, 6:
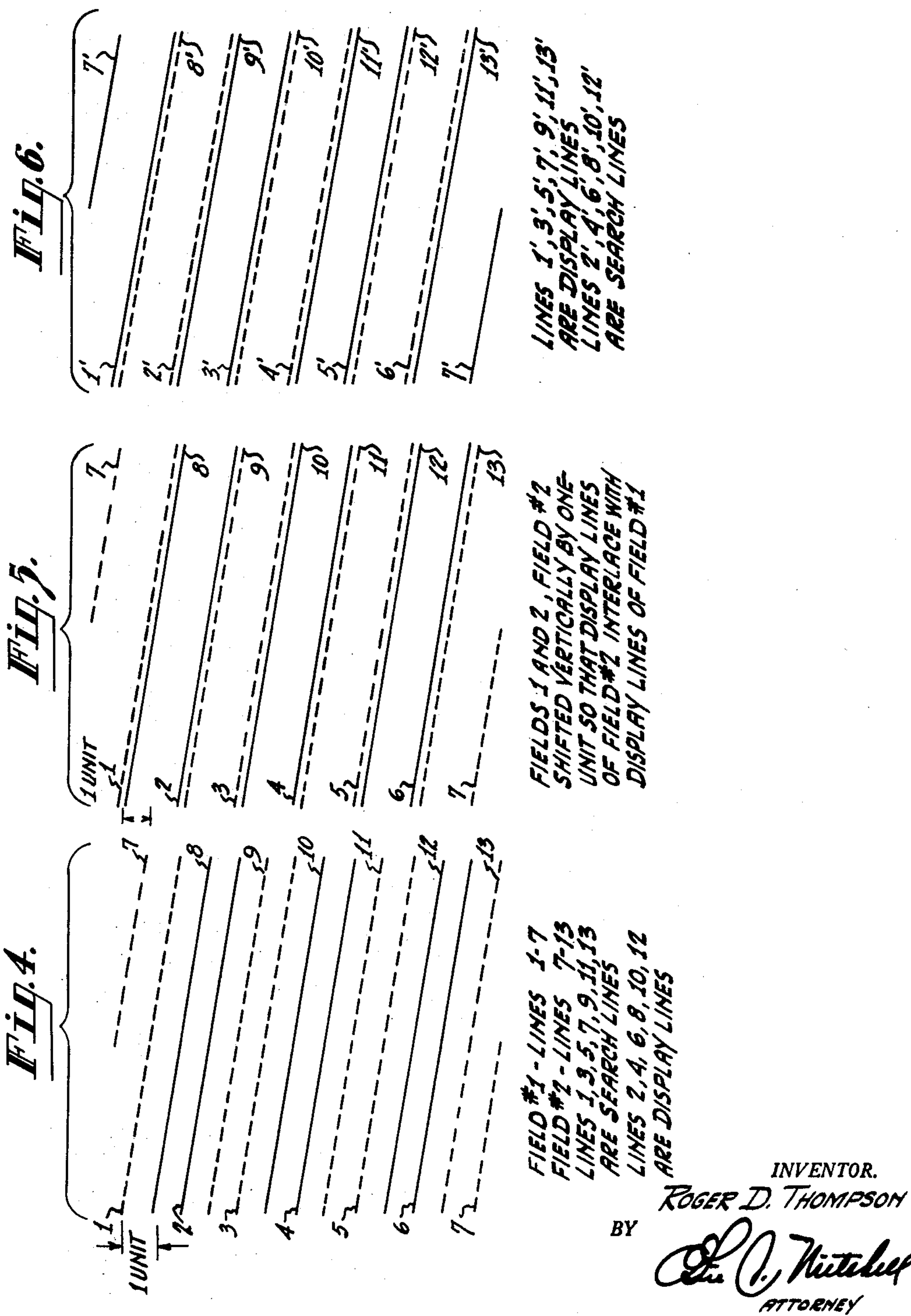

As thus far described, the arrangement of Figure 1 is generally similar to that disclosed in the cited Kell application, namely, one which provides alternate search and display scanning lines. The scanning pattern produced by such an arrangement is illustrated in a simplified form in Figure 4 which shows two successive fields totaling an odd number "N" of lines (N being equal to 13 in the illustration). The total number of lines in the two fields comprising a television frame is illustrated as being an odd number by reason of the fact that, in conventional television practice, each frame is made up of two interlaced fields, each field having 262½ lines, making a total of 525 lines for the frame. As indicated in Figure 4, field 1 comprises lines 1–7, line 7 ending after one-half of a line scan and field 2 comprises the second half of line 7 and lines 8–13. Assuming conventional television receiver deflection circuitry as indicated by the block 35 of Figure 1, the two fields will be interlaced vertically, so that lines 8–13 are interlaced with lines 1–7.

Since, as explained, the sequence assumed is one of alternate search and display (S–D), lines 1, 3, 5, 7, 9, 11 and 13 are search lines (shown in dotted lines), while lines 2, 4, 6, 8, 10 and 12 are picture display lines (shown in solid lines). As may be seen, the display lines of a single frame (i.e., fields 1 and 2) are paired, such that lines 2 and 8 form a pair, lines 4 and 10 form a second pair and lines 6 and 12 form a third pair. Because of the fact that the display lines are normally brighter than the search lines, the pairing of the display lines of a frame as shown in Figure 4 has been found to be objectionable, despite the fact that the image resolution is not unduly impaired. The present invention provides means, represented by the stairstep generator 85 (Figure 1), for causing the display lines of successive fields to be so located with respect to each other as to afford a frame whose display lines are equispaced. Such means, to be described in detail hereinafter, may comprise circuitry for shifting alternate fields upwardly by a single unit of space, where one unit is equal to half the distance between the lines of a field (i.e., one half the space between lines 1 and 2). The resultant frame pattern is shown in Figure 5, where lines 1–7 represent the first scanning field, as in Figure 4, and lines 7–13 constitute the second field. It is noted from Figure 5 that the second field has been shifted upwardly by one unit with respect to the lines forming the first field, so that lines 8–13 coincide with lines 1–6. The effect of this vertical shift of the second field of a frame is that of causing the display lines of the frame (lines 2, 4, 6, 8, 10 and 12) to be equispaced from each other or vertically interlaced.

A further factor found in connection with the unvarying search-display sequence is that four successive fields (or two successive frames) are required to complete a cycle of operation in which each one of the scanning lines is used for both search and display. There results from this cycle a vertical "crawl" or apparent movement of the display lines, which crawl is accompanied by a low frequency flicker. Such crawl and flicker are eliminated in accordance with the present invention through the agency of means for resetting the sequence of search and display at the end of each frame. That is to say, Figure 6 illustrates the scanning lines of fields 3 and 4 which would normally follow the scanning lines shown in Figure 5 in the absence of a frame-rate resetting. Since, as may be seen from Figure 5, the last line of field No. 2 is also a search line (line 13), the first line of field No. 3 would normally be a display line (line 1 of Figure 6). By resetting the search-display sequence at the end of frame 1, however, the first line of field No. 3 is caused to be a search line, as was line No. 1 of the first field. Through the expedients of producing the frame rate sequence resetting and the vertical shifting of alternate fields by one unit of spacing, both the pairing of display lines and crawl are eliminated in accordance with one form of the present invention.

An alternative mode of eliminating the display line-pairing described in connection with Figure 4 is illustrated diagrammatically in Figure 7, which mode involves triggering successive fields in such manner as to cause the first field of a frame to have $$\frac{N}{2}+\frac{1}{2}$$

lines, while the next field of that frame has $$\frac{N}{2}-\frac{1}{2}$$

lines, N being an odd number. That is to say, a standard television frame in accordance with U.S. practice is made up of 525 lines (i.e., $N=525$). Normally, each field comprises ½ of 525 lines or 262½ lines, as has been mentioned. By triggering the vertical deflection generator of a scanning system in such manner as to cause the first field of a frame to have 263 lines and the next field of the frame to have 262 lines, a result similar to that illustrated in Figure 7 is produced. In Figure 7, the simplified showing is of a frame made up of a total of 13 lines, the first field including lines 1–7

$$\left(\frac{N}{2}+\frac{1}{2}, \text{ where } N=13\right)$$

and the second field including 6 lines $$\left(\frac{N}{2}-\frac{1}{2}, \text{ where N is 13}\right)$$

Figure 7:
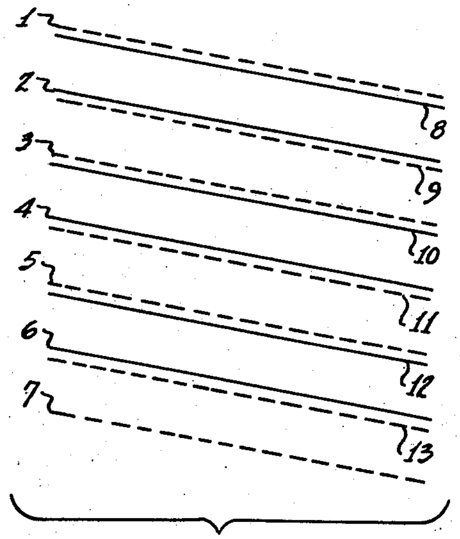

An advantage of the mode of operation illustrated in Figure 7 is that the display lines of the second field (i.e., lines 8, 10 and 12) are vertically interlaced with the display lines of the first field (i.e., lines 2, 4, and 6). In employing this system in which each field has an integral number of lines, the sequence of search and display should be shifted at a 30 c.p.s. rate, as described in connection with Figures 4–6. That is, the sequence of search and display should be caused to repeat every frame, in order that a 30 c.p.s. flicker between the lines may be eliminated.

Thus far, it has been assumed that the scanning raster is substantially rectangular, so that its sides are vertical or straight. Where, however, the pattern of scanning is somewhat distorted (e.g., pincushioned or barrelled) in such manner that the sides of the raster are not straight, it may be desirable to employ a system such as that represented in Figure 8 in which the search and display lines of each S–D group are substantially coincident with each other, such that the raster search lines actually search along the line which is to be displayed next. More specifically, and as may be seen from Figure 8, this mode of operation involves movement of at least one of the search and display lines of a group vertically so that it coincides with the other. Thus, line 2 is shown as substantially coincident with its predecessor search line 1. Similarly, display line 4 is moved up so that it is in coincidence with its search line 3. Display line 6 is also in coincidence with its search line 5. The same is true of the search and display lines of the second field of the frame, so that there is coincidence between lines 7 and 8, 9 and 10, and 11 and 12. In order to fill in the gaps left by the movement of the lines of field 1, field 2 is shifted vertically by 1 unit, so that the display lines of field No. 2 are interlaced with the display lines of field No. 1, thereby affording a frame whose display lines are equidistant from each other. Such vertical shifting of the second field of each frame eliminates line-pairing. In order to avoid any undesirable flicker and/or crawl, the search-display sequence should be reset at the end of each frame, as described in connection with Figures 4–6. While this arrangement of searching and displaying along the same path has been described in connection with the simple search-display sequence, further utility of the system will become apparent from the description of Figures 9–13 which illustrate a different sequence of search and display lines.

Figure 9:
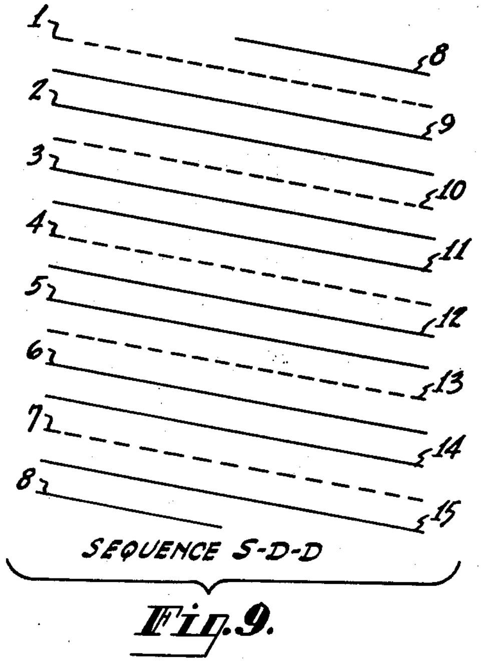

Figure 9 illustrates diagrammatically a raster pattern of two successive fields in which the sequence is search-display-display (S–D–D). That is, line 1 is a search line followed by lines 2 and 3 which are display lines. Line 4 is a search line followed by display lines 5 and 6. Line 7 is again a search line, followed by the first half of line 8, a display line, which ends the first field of the 15 line frame raster. The second half of line 8 and line 9 are also display lines. The sequence of search-display-display continues through lines 10–15. The pattern formed from this simplest form of sequence having more than one display line in the sequence produces, however, a frame raster whose display lines are paired. That is, lines 2 and 9, 3 and 11, 5 and 12, and 6 and 14 form distinct pairs. This pairing may be readily eliminated by one of several arrangements, one of which is illustrated in Figure 10.

Figure 10:
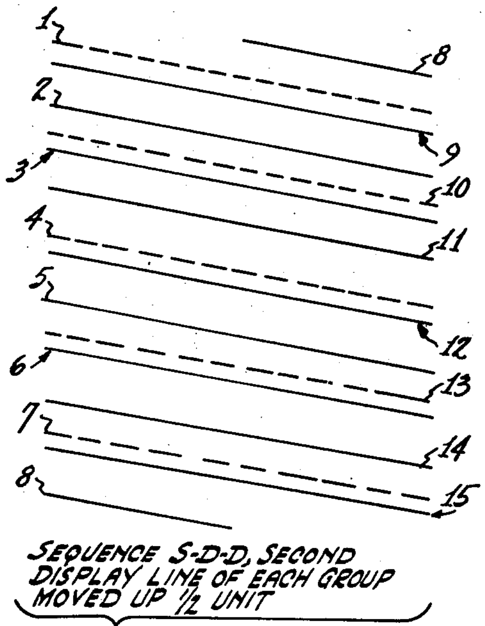

In the arrangement of Figure 10, as may be seen from the drawing, the second display line of each S–D–D sequence is moved up by ½ unit of space. This upward movement is represented by the arrows adjacent lines 3, 6, 9, 12 and 15 which are the second display lines of their respective groups. The result of such upward movement of the second display line of each group by ½ unit is that the display lines of the frame made up of the two fields are equispaced, rather than being paired as shown in Figure 9. By reason of the fact that the conventional 525-line frame is divisible by 3 (525 divided by 3 equals 175), no resetting of the search and display sequence is required at the end of each frame for the simple three-line S-D-D sequence. That is, the last line of field 2 (line 15) ends a sequence of S-D-D lines, so that the third field will begin, as did the first field, with the sequence S-D-D. It may be noted that, while the pattern of Figure 10 is substantially free of display line pairing and affords the advantage of increased brightness over the simpler S-D sequence, the fact that, as in Figure 10, adjacent display lines of the same field are moved closer together may have the somewhat undesirable effect of producing a noticeable scanning line structure when the image reproduced is one which moves vertically. Such structure would have components of $$\frac{175}{2}\left(\text{i.e., } \tfrac{1}{2} \text{ of } \frac{525}{3}\right)$$

Figure 11:
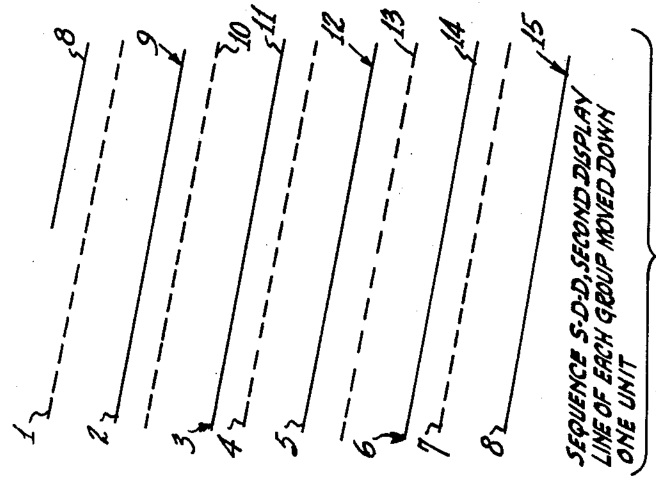

This $$\frac{175}{2}$$

component of structure, if objectionable, may be eliminated by resort to the arrangement shown in Figure 11 which also involves the S-D-D sequence but in which the second display line of each S-D-D- group is moved down one unit of space, as represented by the arrows adjacent lines 3, 6, 9, 12 and 15. The net result of such downward movement of the second display line of each group is that these display lines of field No. 2 (lines 9, 12 and 15) coincide with certain of the display lines of field No. 1 (lines 2, 5 and 8). In the arrangement of Figure 11, no vertical shift of alternate field rasters is required, nor is it necessary to reset the search and display sequence.

It will be appreciated from the showing of Figure 11, as compared with Figure 10, that the Figure 11 arrangement substantially eliminates any spurious effects which might be induced by motion of the image, since the same lines are displayed lines every field. It may, however, be considered somewhat disadvantageous that the arrangement of Figure 11 affords only half the number of display lines in a frame which would be available if the display lines of successive fields were not coincident. In such event, resort may be had to the mode of operation illustrated by Figure 12 which indicates a frame pattern in which the second line of each S–D–D group is moved downwardly one unit, as described in connection with Figure 11 and in which, additionally, the second field of the frame is shifted vertically by 1½ units in order to cause the display lines of the second field to be interlaced with the display lines of the first field. Thus, as shown, lines 9, 11, 12, 14 and 15 of field 2 are interlaced with the display lines 2, 3, 5, 6, and 8 of field 1. Any motion effects which may be induced in the pattern of Figure 12 would be a simple apparent movement from one display line to the next display line, as opposed to the pattern of Figure 10 in which motion is from one pair of display lines to the next pair of display lines, resulting in the described $$\frac{175}{2}$$

component.

Figure 13:
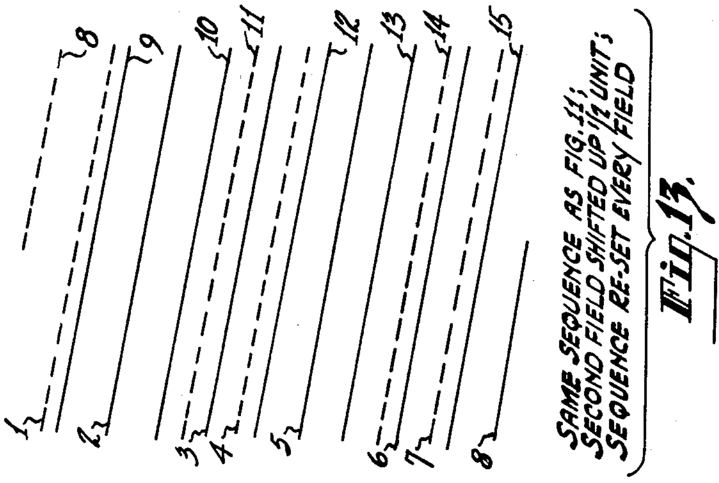

Still another arrangement which may be advantageously employed with the S–D–D sequence is illustrated in Figure 13, in which the second display line of each S–D–D– group is again moved downwardly by one unit. As opposed to Figures 11 and 12, however, the second field of the frame in Figure 13 is shifted vertically by only ½ unit. This causes he display lines of the second field to be vertically interlaced with the display lines of the first field and, by virtue of the relatively small amount of vertical shift of the second field, the displacement error which results is substantially negligible. (By "displacement error" is meant the relative position of a display line on the screen of the tube with respect to the position of the transmitter pickup scanning line whose video information is being reproduced by the display line in question.) It will be appreciated, therefore, that the pattern of Figure 13 has a smaller displacement error than that which results from the arrangement depicted in Figure 12. With the system of Figure 13, however, it is desirable to reset the sequence of search and display at the beginning of each field. That is, and as may be seen from Figure 13, field 1 ended (the first half of line 8) with a display line. Field No. 2, however, is reset so that it begins (the second half of line No. 8) with a search line, lines 9 and 10 being display lines to complete the search-display-display sequence begun with the second half of line No. 8. While Figure 13 has been described as involving resetting of the S-D-D sequence on the first line of each field, such resetting may be accomplished on lines other than the first line with an appropriate change in sense of the vertical deflection of alternate field rasters. In each of Figures 12 and 13, the vertical shift of the second field of each frame may be accomplished, at least in part, by triggering the final lines of successive fields in the manner described in connection with Figure 7, that is, to cause successive fields to constitute $$\frac{N}{2}-\frac{1}{2}$$

and $$\frac{N}{2}+\frac{1}{2}$$

lines, respectively.

It should also be borne in mind that, in any of the arrangements involving a plurality of display lines for each search line (as in the S-D-D sequence), the search line of each group may be deflected to the center of the group of display lines which it controls in order for greatest accuracy of such control to be realized. It should also be noted that, while the two basic sequences S–D and S–D–D have been described specifically herein by way of example, other sequences involving a greater number of display lines for each search line may be employed. In any event, it is necessary only to utilize one of the expedients described herein for causing the display lines of a frame to be equispaced from each other, and, if any movement such as line crawl should occur, to reset the sequence at appropriate intervals for the elimination of such movement.

Figure 14 illustrates a specific circuit capable of performing all of the functions described thus far in connection with sequence control and deflection control, with a single exception to be described hereinafter and which relates to the function of resetting the sequence each field, as opposed to resetting it at a frame rate. The circuirty of Figure 14 will be described, for clarity, in the order of the various raster patterns and sequences described in connection with Figures 4–13. That is to say, Figure 14 illustrates an overall circuit which may be adapted for various search and display sequences, with or without sequence-resetting and with or without changing of the vertical deflection operation. It will be understood, therefore, that any specific embodiment of the invention for any given sequence may not require all of the circuitry shown.

Insofar as the function of producing alternate search and display lines is concerned, which function has been described in general terms in connection with the block diagram of Figure 1, signals corresponding to the half-line frequency waves such as that shown by the wave 62 in Figure 1 may be produced with the apparatus of Figure 14 in the following manner: negative-going horizontal frequency drive or synchronizing pulses 90 derived from a suitable source such as the input to the deflection circuits 35 (Figure 1) are applied to the input terminal 92 of a horizontal drive pulse amplifier and clipper stage 94. The left- and right-hand portions of the tube 94 are connected in cascade to amplify and clip the drive pulses 90 which occur at the horizontal line scanning rate. Since stage 94 produces two polarity reversals, the output pulses 96 are also negative-going and are applied via a capacitor 98 to the input 100 of a pair of diodes, connected as shown, which may be contained within the same tube envelope 102. The pulse 96 is passed by the right-hand diode of the pair to charge a capacitor 104 with the polarity shown. The capacitor 104 is connected in circuit with the cathode 106 of a blocking tube oscillator which further includes a control grid 108 and anode 110. Biasing of the blocking tube oscillator is controlled by the setting of an adjustable "counter" potentiometer 112, connected to the cathode 106 of the oscillator through the serially connected diodes. Assuming that the sequence to be employed is the simple S–D sequence described in connection with Figures 4–8, the potentiometer 112 is adjusted so that two successive ones of the pulses 96 charge the capacitor 104 of the blocking oscillator sufficiently negative to cause the oscillator to fire or conduct. This condition is represented by the waveform 114 which appears at the cathode of the blocking oscillator. This waveform is a square wave of half the line scanning frequency and is applied via the lead 116 to the control grid 118 of a phase splitter stage having an anode 120 and cathode 122. Opposite polarities of the square wave 114 thus appear at the anode and cathode output leads 124 and 126, respectively.

The wave at the output lead 124 will thus be understood as being the reverse of the wave 114 and is applied via a level setting diode 128 to the control grid 130 of a gating pulse clipper tube 132. The output waveform of the tube 132 is shown at 134 and may be inverted in polarity and applied as the gating pulse to the gated amplifier 38 in Figure 1 which passes index signals from the photocell 36 only during alternate lines. Specifically, the waveform 134 after polarity reversal corresponds to the wave 62 shown in Figure 1, so that, during one line, the gated amplifier 38 is rendered conductive and the cathode of the kinescope 22 is made sufficiently positive to reduce the intensity of the scanning beam in the tube to its low level search intensity. The wave 134 may be applied to the gated amplifier 60. In this manner, alternate lines of a field are caused to serve as search and display lines, respectively.

In order to perform the vertical shift of alternate fields as described in connection with Figures 5 and 6, for example, the following circuitry of Figure 14 is employed: vertical or field frequency drive or synchronizing pulses 136 whose leading edges coincide with the commencement of successive vertical retrace intervals and which may be derived from the input to the deflection generator are applied to an input terminal 138. The pulses 136 are differentiated by means of a capacitor 140 and resistor 142 to provide a spiked waveform 144. These spikes are amplified by the tubes comprising respectively the control grids 146 and 148 and are, in turn, applied via a lead 150 to one input terminal 152 of a multivibrator 154 whose operation will be described in detail hereinafter. The vertical drive pulses 136 are also applied from the terminal 138 via a differentiating circuit comprising a series capacitor 156 and shunt resistor 158 to the control grid 160 of an adder tube 162. The horizontal frequency drive pulses 90 are applied from the terminal 92 via a lead 164 to a second control grid input terminal 166 of the adder tube 162. The differentiated vertical frequency drive pulses and the horizontal frequency drive pulses are added by the tube 162 to produce the composite waveform 168 shown at the output lead 170 of the adder tube. That is, the horizontal frequency drive pulses are superimposed on the generally sawtooth shaped wave produced by differentiation of the vertical frequency pulses. As will be understood by those skilled in the art, vertical interlace in conventional television practice involves the shifting of the phase of a line triggering or drive pulse each field in order that a first field of a frame may be caused to terminate half way through a line scan period while the next field of that frame terminates after a completed line (lines 7 and 13 of Figure 4, respectively). Thus, during one field, a horizontal drive pulse 90' will appear at the peak of the differentiated vertical frequency pulse in the waveform 168, while that pulse 90' will be moved downwardly to the position 90'' the next field. This fact is employed in the apparatus of Figure 14 in such manner as to afford "sense" of alternate fields.

The waveform 168 is applied via a capacitor 172 to the control grid 174 of a coincidence pulse clipper tube which further comprises a cathode 176 and anode 178. This tube is so biased by means including the grid resistor 180 that it conducts only when a horizontal drive pulse 90' appears at the very peak of the differentiated vertical frequency pulse of the wave 168. Thus, the output wave of the clipper tube comprises negative-going trigger pulses 182 which occur at the rate of 30 per second (i.e., one pulse every other field). These triggers 182 are applied to the anode of the right-hand tube of the multivibrator 154 and to the control grid of the left-hand tube, causing the right-hand tube to conduct and cutting off conduction of the left-hand tube of the multivibrator.

As stated, the multivibrator 154 also receives at its output terminal 152 the negative-going spikes produced by differentiation of the vertical drive pulses (waveform 144). The spikes of the waveform 144, occurring at the rate of 60 per second, would tend to trigger the multivibrator 154 every field. Since the trigger 182 from the pulse clipper tube anode 178 are of greater amplitude and longer duration, these triggers are controlling, so that the multivibrator 154 operates to produce a square wave output of 30 c.p.s. Either polarity of this 30 c.p.s. square wave may be selected by means of a switch 184 and applied via a lead 186 to the control grid 188 of a frame rate deflection amplifier 190. A switch 192 may be closed to complete the cathode circuit of the amplifier 190 to render the tube operative when it is desired to introduce a 30 c.p.s. or frame rate shift in the vertical deflection of the scanning beam. The amplitude of the output wave of the amplifier 190 is adjustable by means of a variable resistor 194 connected to the cathode of the amplifier to serve as a gain control. The anode 196 of the 30 c.p.s. deflection amplifier 190 is connected to an output terminal 198 across a load resistor 200. The terminal 198 may be connected to the vertical deflection winding of the yoke 34 (Figure 1) or to auxiliary vertical deflection means, such as a winding (not shown), such that energization of the auxiliary deflection means by the output of tube 190 produces vertical deflection of the scanning beam at a frame rate. Thus, the vertical shift of field 2 by one unit shown in Figure 5 is effected by adjusting the gain control resistor 194 so that the requisite amount of deflection is afforded.

Figure 12:
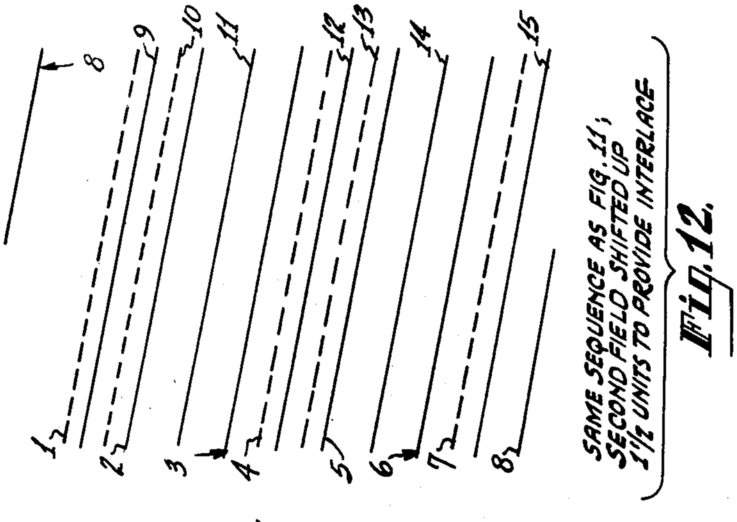

Similarly, the vertical shift of field No. 2 in Figure 12 by 1½ units may be accomplished by adjusting the gain control resistor 194 of the frame rate deflection amplifier 190 to increase the gain of that tube in an amount sufficient to energize the vertical deflection winding by the amount required to produce that degree of deflection. The vertical shift of the second field shown in Figure 13 is, as has been stated, in the amount of ½ unit. In order to effect this amount of shift, the gain of the amplifier 190 is decreased so that that degree of vertical deflection is afforded during alternate fields.

Certain of the arrangements described require resetting of the searching-displaying sequence at a frame rate. Such resetting is accomplished in the following manner: the composite waveform 168, made up of differentiated vertical drive pulses and superimposed horizontal drive pulses, is applied via a resistor 202 to the control grid 204 of a frame-rate resetting tube which also includes a cathode 206 and anode 208. Switch 210, when closed, connects the cathode 206 to ground and renders the tube operative. The control grid 204 is biased in a manner similar to that described for the grid 174. With the switch closed, therefore, the tube including the control grid 204 will conduct only for those horizontal drive pulses 90' which appear at the peak of the differentiated vertical drive pulse, which condition obtains only during alternate fields or at a frame rate, as described. The pulse 90' overcomes the bias on the control grid 204 so that a pulse of current flows through the anode-cathode circuit of that tube. Since the anode 208 is connected to the anode 110 of the blocking tube oscillator, conduction of the tube including anode 208 will cause the blocking tube oscillator to fire coincidentally therewith, thereby effecting a resetting of the search-display sequence of square wave produced by the blocking tube oscillator. Viewed otherwise, the effect of the frame rate resetting tube on the search and display sequence may be understood as causing the sequence to skip a beat upon the conduction of the tube including anode 208.

The field rate sequence resetting described in connection with Figure 13 may be accomplished through a simple change in the circuit of Figure 14, as illustrated in Figure 15. This change involves only disconnecting the control grid 204 of the frame resetting switch tube from the anode of the pulse adder tube 162 and connecting it to the terminal 212 of the vertical drive amplifier circuit via a lead 212'. The effect of this circuit change is that of pulsing the control grid 204 of the sequence resetting tube so that it conducts at the beginning of each field, rather than at the beginning of each frame. The circuit of Figure 15, therefore, causes the search and display sequence to recommence at the beginning of each field, as disclosed in Figure 13.

Figure 8:
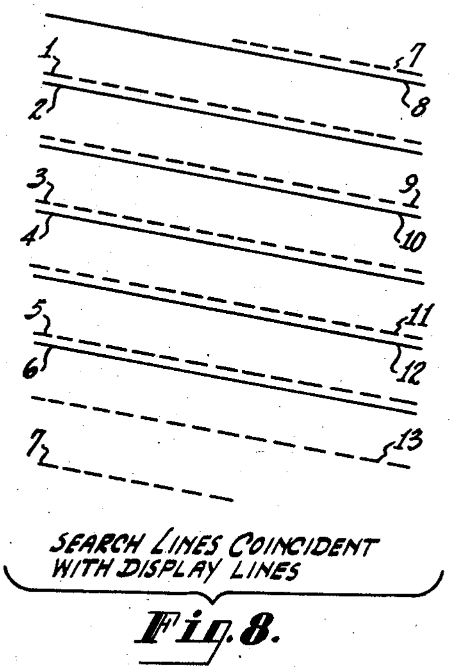

Figure 8, as set forth, discloses a scanning pattern in which each display line is moved upwardly so that it coincides with the preceding search line. Circuitry for accomplishing this function is illustrated in Figure 14 and will now be described. The waveform 134 appearing in the anode circuit of the gating pulse clipper tube 132 is applied via a level setting diode 214 to the control grid 216 of an auxiliary deflection amplifier 218 which may be termed a search-deflection amplifier. A switch 220 serves to connect the amplifier cathode 222 to ground whereby to render the tube 218 operative. With the switch 220 closed, therefore, the waveform 134 applied to the control grid 216 is amplified by the tube 218 and appears at the anode output terminal 224 across the load resistor 200 for application via the deflection output terminal 198 to the vertical deflection winding of the yoke 34 or to the auxiliary vertical deflection winding, if one is employed. Adjustment of the gain control resistor 226 in the cathode circuit of the tube 218 serves to control the amplitude of the wave applied to the terminal 198 and may be so made as to cause alternate lines to be moved vertically by the desired distance. This distance, in the arrangement of Figure 8, is 2 units of space (i.e., the distance between successive scanning lines of a field).

Thus far, the circuitry of Figure 14 has been described in connection with the simplest sequence disclosed, namely, the alternate search-display (S–D) sequence. The apparatus shown, however, is also capable of use with other sequences such, for example as the S–D–D sequence described in connection with Figures 9–13. The basic change required for conversion from the S–D to the S–D–D sequence is an adjustment of the counter potentiometer 112 which controls the bias on and timing of the blocking tube oscillator. That is to say, the potentiometer 112 may be adjusted so that the capacitor 104 must receive three successive chargings by the pulses 96 before the blocking tube oscillator is rendered conductive. The output voltage wave of the oscillator derived from cathode 106 with this latter adjustment of its counter potentiometer is indicated by the waveform 114' which, as shown, is a stairstep wave having three steps per cycle. For the S–D–D sequence, therefore, the remaining operation of the circuits associated with the blocking tube oscillator is substantially the same as that described thus far. Briefly, the S–D–D stairstep wave 114' is applied to the control grid 118 of the phase splitter tube and the amplified version thereof is applied to the gating pulse clipper tube 132 which is so biased that it passes only the search pulses, as shown by the waveform 230. This wave appears at the gating pulse output terminal 132' for application to the gated amplifiers shown in Figure 1 with the proper polarity.

The waveform 230 may also be employed in controlling the position of the search line of a group with respect to the two or more display lines of that group or sequence. The manner in which this is accomplished is as follows: the wave 230 is applied to the control grid 216 of the amplifier 218 so that the amplifier 218 conducts differently during a search line from its conduction during display lines. Thus, for example, the amplifier 218 may be understood as conducting less heavily during a search line than during the succeeding two display lines of a S–D–D sequence, the effect of such differential in conduction being that of shifting the search line of each group downwardly from its normal position to a point between the two display lines which follow it. This action may be understood otherwise as deflecting the display lines of a group upwardly so that they are on opposite sides of the preceding search line. It will be understood that the line deflection wave produced by the amplifier 218 appears at the terminal 198 for application to the vertical deflection apparatus.

Another function described in connection with the raster patterns of the preceding figures and, particularly, those of Figures 10–13 is that of moving one of the display lines of a group toward or away from the preceding display line of that group. This function is effected as follows: a stairstep wave amplifier 234 having an anode 236, control grid 238 and cathode 240 is provided, the anode 236 being connected to the load resistor 200 and the output terminal 198. Conduction of the amplifier 234, therefore, will produce a change in the energization of the deflection winding connected to the terminal 198. The control grid 238 of the amplifier 234 receives, via a level setting diode 242, a wave from the phase splitter tube which is associated with the blocking tube oscillator. That is, a signal lead 244 connected to the control grid 238 terminates in a switch 246 which permits connection of the lead 244 to either the anode or cathode circuit of the phase splitter. With the switch 246 in its lower position (shown in the drawing), the wave applied to the amplifier 234 is one derived from the cathode 122 of the phase splitter and is of the same polarity as the waveform 114'. The wave 114' is thus amplified by the tube 234 and applied to the deflection winding. The effect of this additional step wave energy combined with the normal vertical deflection sawtooth waveform is that of causing the display lines of a group to be moved farther apart, so as to be useful, for example, in performing the function shown in Figures 11, 12 and 13 or moving the second display line of each group downwardly. The amount of such downward movement is adjustable by means of the cathode resistor 250 in circuit with the amplifier 234. In order to control vertical deflection of the scanning beam in such manner as to move the display lines of a group closer together, as required for the arrangement of Figure 10, the switch 246 may be moved to connect the lead 244 to the anode circuit of the phase splitter via the lead 252. This applies a wave of opposite polarity from the wave 114' to the control grid of the amplifier 234.

In systems involving a sequence of more than one display line for each search line, such as the S–D–D sequence, it will be appreciated that it is necessary to use the index information derived during the search line of that group for each of the display lines of that group. This requires only the provision of means for recirculating the index information from the output of the 1H (1 horizontal line) delay line 40 of Figure 1 to its input a sufficient number of times to accommodate the display lines of the group in excess of one. Thus, for the S–D–D sequence, the index information is recirculated through the delay line 40 only once for each sequence. Such recirculation may be controlled through an arrangement such as that illustrated in Figure 16, in which reference numerals identical to those of Figure 1 represent corresponding parts. The apparatus in Figure 16 added to that of Figure 1 comprises a gating amplifier stage 40' for feeding information from the output of the delay line back to its input. The gated amplifier may be such as that illustrated in Figure 3 and controlled by signals of the rectangular waveform 230. The waveform 230 is so timed as to permit the gated amplifier 40' to conduct during the display lines of each S–D–D sequence. The auxiliary delay line designated "to," added to the delay of line 40, is equal to one line period. Thus, during that interval, the index information is recirculated from the output of delay line 40 to its input and is, therefore, available at the output of the delay line 40 beginning with the commencement of the second display line interval of that sequence.

As will be recognized from the foregoing, the present invention provides novel systems of operating a vertical line screen kinescope in such manner as to afford improved image rendition through the utilization of certain of the scanning lines of a field, at least in part, as search lines for controlling the production of video images by other lines of the field and in such manner as to eliminate undesirable visual effects such as scanning line-pairing and motion effects.

Having thus described my invention, what I claim as new and desire to secure by Letters Patent is:

1. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and controlled by such index signals for applying color-representative signals to said tube sequentially in such manner as to modulate the intensity of such beam; delay means for delaying the application of index signals to said modulating means for substantially the period of one scanning line interval; means operating in synchronism with said line deflection generator for causing selected lines of a field to be devoted, at least in part, solely to the production of index signals, said means comprising a gate for periodically interrupting the application of said color representative signals to said tube, such that said selected lines constitute screen search lines while the remaining lines of said field constitute display lines active in the production of color image light; and means for so controlling such vertical deflection as to cause the display lines of successive fields to be vertically interlaced.

2. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and controlled by such index signals to apply color-representative signals to said tube sequentially in such manner as to modulate the intensity of such beam; delay means for delaying the application of index signals to said modulating means for substantially the period of one scanning line interval; means operating in synchronism with said line deflection generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; and means for so controlling the vertical deflection of such beam as to cause the display lines to be equispaced from each other at the conclusion of two successive fields.

3. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; and means associated with said field deflection wave generator for so controlling the vertical deflection of such beam as to shift alternate fields vertically with respect to the intervening fields.

4. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; and means associated with said field deflection wave generator for so controlling the vertical deflection of such beam as to shift alternate fields vertically with respect to the intervening fields by an amount sufficient to cause the display lines of alternate fields to be vertically interlaced with the display lines of the intervening fields.

5. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color-representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; and means associated with said line deflection wave generator for so controlling the vertical deflection of such beam as to cause each display line to be substantially coincident with the preceding search line.

6. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succesion of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selecting lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; means for so controlling the vertical deflection of such beams as to cause the display lines of successive fields to be equipspaced from each other at the conclusion of two successive fields; and means operating in synchronism with said field deflection wave generator for controlling said gate in such manner as to cause alternate fields to begin with a search line.

7. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; means for so controlling the vertical deflection of such beam as to cause the display lines of successive fields to be equipspaced from each other at the conclusion of two successive fields; and means operating in synchronism with said field deflection wave generator for controlling said gate in such manner as to cause alternate fields to begin with a search line and the intervening fields to begin with a display line.

8. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selecting lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; and means associated with said field deflection wave generator for so controlling the vertical deflection of such beam as to cause the display lines to be equipspaced from each other at the conclusion of two successive fields, said field deflection wave generator being operative at a rate to produce a frame consisting of two fields whose lines total an odd number N, said vertical deflection controlling means comprising circuitry for causing alternate fields to terminate at the end of $$\frac{N}{2}-\frac{1}{2}$$

lines and the interventing fields to have $$\frac{N}{2}+\frac{1}{2}$$

lines.

9. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing alternate lines of a field to be devoted, at least in part, solely to the production of index signals, said means comprising a gate for periodically interrupting the application of video signals to said tube, such that said alternate lines constitute screen search lines while the intervening lines of said field constitute display lines active in the production of image light; and means for so controlling such vertical deflection as to cause the display lines of successive fields to be vertically interlaced.

10. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light, the sequence of search and display lines including a search line followed by a plurality of display lines; and means for so controlling the vertical deflection of such beam as to cause the display lines to be equispaced from each other at the conclusion of two successive fields.

11. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light; the sequence of search and display lines being a search line followed by two consecutive display lines; and means associated with said deflection means for deflecting the second display line of each such sequence away from the preceding display line by half the distance between such consecutive display lines.

12. The invention as defined by claim 11 including means associated with said vertical deflection wave generator for shifting alternate fields upwardly in an amount sufficient to cause the display lines of such alternate fields to be interlaced with the display lines of the intervening fields.

13. The invention as defined in claim 11 including means for causing each field to begin with a search line; and means associated with said vertical deflection wave generator for shifting alternate fields vertically in an amount sufficient to cause the display lines of such alternate fields to form an interlaced pattern with the display lines of the intervening fields.

14. The invention defined by claim 11 including means for causing the display lines of each such sequence to be located above and below, respectively, the search line of that sequence.

15. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing alternate lines of a field to be devoted, at least in part, solely to the production of index signals, said means comprising a gate for periodically interrupting the application of video signals to said tube, such that said alternate lines constitute screen search lines while the intervening lines of said field constitute display lines active in the production of image light; means associated with said field deflection wave generator for so controlling such vertical deflection as to cause the display lines of successive fields to be vertically interlaced, said last-named means comprising circuitry for shifting alternate fields vertically by half the distance between successive lines of a field; and means for causing alternate fields to begin with a search line.

16. A television system which comprises: image-reproducing apparatus having a screen made up of a plurality of repeating groups of color light-emitting elemental areas and means for scanning said areas in a succession of fields each including a plurality of vertically spaced lines to energize said areas sequentially, said scanning being effected at a relatively fast line rate and at a relatively slow field rate; a source of color-representative signals corresponding to said color light-emitting areas; means associated with said image-reproducing apparatus for deriving index signals from the scansion of said screen in a line scanning direction; modulating means coupled operatively between said color signal source and said index signal-deriving means and adapted to apply color-representative signals to said image-reproducing apparatus sequentially in such manner as to modulate the intensity of such screen area energization under the control of such index signals; delay means for delaying the application of index signals to said modulating means for substantially the period of one scanning line interval; means operating in synchronism with the line scanning of said elemental areas for causing selected lines to a field to be devoted, at least in part, solely to the production of index signals, said means comprising a gate for periodically interrupting the application of video signals to said image-reproducing apparatus, such that said selected lines constitute screen search lines while the remaining lines of said field constitute display lines active in the production of image light; and means for so controlling the vertical scanning of said elemental areas as to cause the display lines of successive fields to be equispaced.

17. Color television image-reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light, the sequence of search and display lines including a search line followed by a plurality of display lines; and means synchronized with said line deflection wave generator for so controlling the vertical deflection of such beam as to cause the display lines of each sequence to be spread apart from each other so that the display lines of a field are equispaced.

18. A television system which comprises: image-reproducing apparatus having a screen made up of a plurality of repeating groups of color light-emitting elemental areas and means for scanning said areas in a succession of fields each including a plurality of vertically spaced lines to energize said areas sequentially, said scanning means comprising line and field deflection wave generators; a source of color-representative signals corresponding to said color light-emitting areas; means associated with said image-reproducing apparatus for deriving index signals from the scansion of said screen in a line scanning direction; modulating means coupled operatively between said color signal source and said index signal-deriving means and adapted to apply color-representative signals to said image-reproducing apparatus sequentially in such manner as to modulate the intensity of such screen area energization under the control of such index signals; delay means for delaying the application of index signals to said modulating means for substantially the period of one scanning line interval; means operating in synchronism with said line deflection wave generator for causing selected lines of a field to be devoted, at least in part, solely to the production of index signals, said means comprising a gate for periodically interrupting the application of video signals to said image-reproducing apparatus, such that said selected lines constitute screen search lines while the remaining lines of said field constitute display lines active in the production of image light, the field being made up of groups of search and display lines, each group consisting of a search line and a plurality of display lines; and means for so controlling the vertical deflection of said scanning means as to spread apart the display lines of each group in an amount sufficient to cause the display lines of each field to be equispaced.

19. Color television image reproducing apparatus which comprises: a cathode ray tube having a target screen made up of a plurality of repeating groups of color light-emitting strip-like areas and means for directing an electron beam toward said screen; deflection means for causing such beam to scan said screen in a succession of fields each including a plurality of vertically spaced lines, said deflection means comprising line and field deflection wave generators; a source of color representative signals corresponding to said color light-emitting areas; means associated with said tube for deriving index signals from the scansion of said screen by such beam in a line scanning direction; modulating means coupled operatively between said color signal source and said index signal-deriving means and adapted to apply color-representative signals to said tube sequentially in such manner as to modulate the intensity of such beam under the control of such index signals; delay means for delaying the application of index signals to said modulating means for substantially the period of one scanning line interval; means operating in synchronism with said line deflection generator for causing selected lines of a field to be devoted, at least in part, solely to the production of index signals, said means comprising a gate for periodically interrupting the application of video signals to said tube, such that said selected lines constitute screen search lines while the remaining lines of said field constitute display lines active in the production of image light, the sequence of search and display lines including a search line followed by a plurality of display lines; and means synchronized with said line deflection wave generator for so controlling the vertical deflection of said beam as to cause the first and last display lines of each group to be substantially equidistant from the search line of that group.

20. A television system which comprises: image-reproducing apparatus having a screen made up of a plurality of repeating groups of color light-emitting elemental areas and means for scanning said areas in a succession of fields each including a plurality of vertically spaced lines to energize said areas sequentially, said scanning being effected at a relatively fast line rate and at a relatively slow field rate; a source of color-representative signals corresponding to said color light-emitting areas; means associated with said image-reproducing apparatus for deriving index signals from the scansion of said screen in a line scanning direction; modulating means coupled operatively between said color signal source and said index signal-deriving means and adapted to apply color-representative signals to said image-reproducing apparatus sequentially in such manner as to modulated the intensity of such screen area energization under the control of such index signals; delay means for delaying the application of index signals to said modulating means for substantially the period of one scanning line interval; means operating in synchronism with the scanning of said elemental areas for causing selected lines of a field to be devoted, at least in part, solely to the production of index signals, said means comprising a gate for periodically interrupting the application of video signals to said image-reproducing apparatus, such that said selected lines constitute screen search lines while the remaining lines of said field constitute display lines active in the production of image light; the first being made up of groups of search and display lines, each group consisting of a search line and a plurality of display lines; and means synchronized with the line scanning for so controlling the vertical scanning of said elemental areas as to cause the first and last display lines of each group to be substantially equidistant from the search line of that group.

References Cited in the file of this patent

UNITED STATES PATENTS

| | | |
|---|---|---|
| 2,644,855 | Bradley | July 7, 1953 |
| 2,713,605 | Bradley | July 19, 1955 |
| 2,831,052 | Boothroyd | Apr. 15, 1958 |